Sept. 17, 1957 J. L. KLOMP 2,806,734
GRUBBING TONGS
Filed April 12, 1955
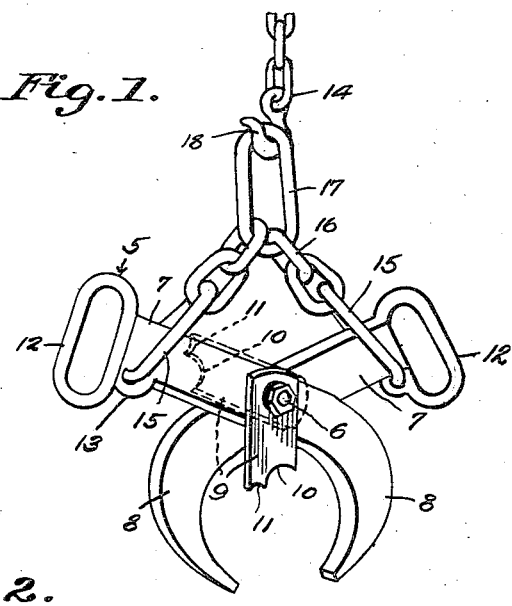
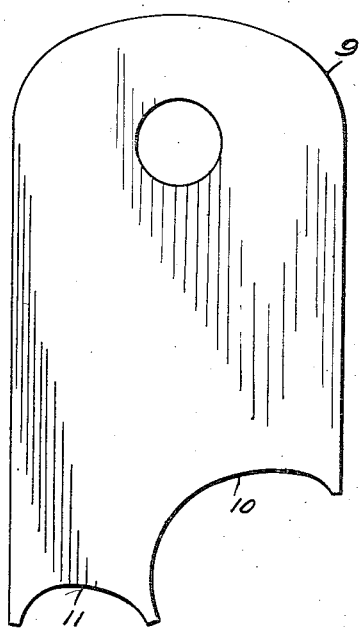
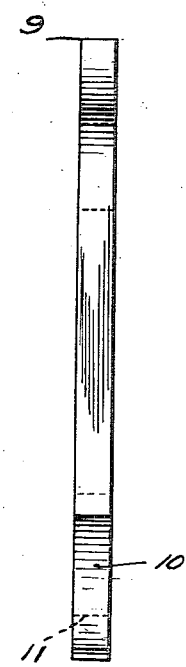
Johannes L. Klomp
INVENTOR

United States Patent Office 2,806,734
Patented Sept. 17, 1957

2,806,734
GRUBBING TONGS

Johannes L. Klomp, Newburgh, N. Y., assignor, by mesne assignments, to Shox-Stok, Inc., Wellington, Ohio Application April 12, 1955, Serial No. 500,729

1 Claim. (Cl. 294—108)

This invention relates to grubbing tongs used in clearing land of trees, brush or the like, the primary object of the invention being to provide tongs which may be positioned around the trunk of a tree at its base, the tongs being so constructed that as power is applied to the tong handles in pulling trees, brush or the like, the jaws of the tongs will be forced into gripping relation with the tree trunk being pulled.

An important object of the invention is to provide tongs equipped with a swinging brush plate mounted at the pivot point between the arms of the tongs, and which plate operates to adapt the tongs for use in gripping and pulling trees and brush of various sizes, thus eliminating the necessity of changing the grubbing tongs for pulling trees or brush having trunks of different diameters.

Still another object of the invention is to provide hand grips on the handle ends of the cross arms of the tongs to facilitate handling and positioning of the tongs around a tree or brush trunk.

A further object of the invention is to connect the power chains to the grubbing tongs in such a way that the power is applied to the tongs from the side of the tongs farthest away from the power plant, providing an exceptionally strong grubbing tongs which will withstand severe strain incident to pulling exceptionally large trees.

Other and further objects and advantages of the invention will be hereinafter described and the novel features thereof defined in the appended claim.

Referring to the drawings:

Fig. 1 is a perspective view of grubbing tongs constructed in accordance with the invention.

Fig. 2 is an enlarged elevational view of a brush plate used in connection with the pivoted arms of the tongs.

Fig. 3 is an edge elevational view of the brush plate.

Referring to the drawing in detail, the tongs embody a pair of arms indicated generally by the reference character 5, which arms are crossed and pivotally connected at the point of crossing, by means of the pivot bolt 6. The bolt 6 divides the arms into handles 7 and inwardly curved jaws 8, the jaws 8 being curved to fit around a tree trunk or brush trunk.

The reference character 9 indicates a brush plate, which is pivotally connected at one of its ends to the arms of the tongs, by the pivot bolt 6, the brush plate being of a length so that it may be moved to a position as shown by Fig. 1 of the drawing, where the free end of the brush plate extends into the space between the jaws 8, reducing the area of the space to adapt the tongs for use in gripping tree trunks or brush trunks of smaller diameters.

The free end of the brush plate 9 is curved, providing a substantially large gripping surface 10 and a smaller gripping surface 11, the gripping surface 11 being located in advance of the gripping surface 10 so that the tongs may be used in gripping an exceptionally small trunk of a tree or brush. This brush plate when moved to the position as shown by Figure 1 of the drawing, tends to hold the small brush or saplings in position to be gripped by the jaws without slipping under the strain directed to the tongs in pulling small brush or saplings.

It will of course be understood that since the brush plate 9 is pivotally connected with the arms of the grubbing tongs, it may be readily swung from the position as shown in Fig. 1 of the drawing, to a position as illustrated in dotted lines in Fig. 1 of the drawing where it will lie parallel with one of the arms of the tongs and be out of the way for use of the tongs in gripping substantially large tree trunks.

Hand grips 12 are formed at the inner ends of the arms 5, the hand grips 12 being disposed transversely of the arms 5 with their side faces parallel with the side faces of the arms 5 so that the tongs may be readily gripped by the operator and held in a horizontal position with the jaws 8 disposed forwardly for positioning around a tree trunk or brush trunk. Further due to the construction of the handles, the tongs may be balanced easily during the positioning or removal of said tongs to facilitate the use of the tongs.

As shown by Fig. 1 of the drawing, enlargements 13 are formed on the edges of the arms 5 farthest away from the power chain 14, the enlargements 13 being apertured to receive the connecting links 15 of the chains 16, which chains are connected with the power chain 14, through the master link 17, that is fitted over the hook 18, so that the grubbing tongs are removably connected with the power chain to facilitate the positioning of the tongs. Because of the manner of mounting the connecting links 15 it will be seen that any pull directed to the power chain 14 will tend to pull the handle ends of the arms 5 towards each other and the pull directed to the handle arms will be directed to the side edges of the arms farthest away from the power chain 14 providing an exceptionally strong connection between the power chain and the tongs.

From the foregoing it will be seen that due to the construction shown and described, I have provided grubbing tongs that are formed with a pivoted brush plate which is so constructed and arranged that it may be swung into a position within the area or between the jaws of the tongs to reduce the space between the jaws to permit the jaws to be clamped around trunks of substantially small trees or brush, without danger of the tongs slipping over the trunk of the tree or brush during the pulling operation.

While the specific details of one embodiment of this invention have been herein shown and described, the invention is not confined thereto as changes and alterations may be made without departing from the spirit and scope thereof as defined in the appended claim.

I claim:

Tongs comprising a pair of cross arms, a pivot pin connecting said cross arms intermediate the ends thereof providing jaw and handle sections, a laterally swinging brush plate pivotally mounted on said pivot pin, said brush plate resting against the outer surface of one of said jaws, the free end of said brush plate adapted to engage brush or tree growth around which said jaws are positioned, forcing the brush or tree growth into gripping relation with said jaws as said cross arms are pulled towards each other in removing brush or tree growth.

References Cited in the file of this patent
UNITED STATES PATENTS

| | | |
|---|---|---|
| 87,844 | Hale | Mar. 16, 1869 |
| 1,128,277 | Adler | Feb. 16, 1915 |
| 1,250,690 | Stallings | Dec. 18, 1917 |
| 1,699,022 | Riel | Jan. 15, 1929 |
| 1,972,583 | Cullen | Sept. 4, 1934 |
| 2,214,985 | Bachmann | Sept. 17, 1940 |